United States Patent [19]

Stockman

[11] Patent Number: 5,138,519

[45] Date of Patent: Aug. 11, 1992

[54] SELECTIVELY VARIABLE CAPACITOR

[76] Inventor: Robert M. Stockman, 43 Sea Vista Dr., Palm Coast, Fla. 32037

[21] Appl. No.: 760,177

[22] Filed: Sep. 16, 1991

[51] Int. Cl.$^5$ .................. H01G 1/14; H01G 4/38; H01G 9/10

[52] U.S. Cl. .................. 361/306; 361/329; 361/537

[58] Field of Search .......... 361/277, 278, 272, 275, 361/328, 329, 330, 306, 535-541

[56] References Cited

U.S. PATENT DOCUMENTS 4,558,394 12/1985 Stockman .................. 361/306
4,639,827 1/1987 Strange et al. .................. 361/272
4,812,941 3/1989 Rice et al. .................. 361/272 X Primary Examiner—Donald A. Griffin

[57] ABSTRACT

A capacitor unit includes a housing having a pair of conventional electrical terminals. Contained within the housing are a pair of capacitors connected in parallel to the two terminals. One of the capacitors is connected to one of the terminals by a relatively thin wire which passes to the terminal through an anchoring location. The wire is connected in such a fashion that rotation of the terminal by a service man will break it. This reduces the capacitance of the unit to that of the remaining capacitor.

9 Claims, 1 Drawing Sheet

SELECTIVELY VARIABLE CAPACITOR

TECHNICAL FIELD

This invention relates to electrical capacitors. More particularly, it relates to a capacitor whose capacitance may be readily changed in the field by a service man.

BACKGROUND ART

In my U.S. Pat. No. 3,921,041, which issued Nov. 18, 1975, there is disclosed a dual metallized capacitor. That device comprises a single capacitor section conventionally wound with two metallized films. After winding the first capacitor, the metallized layer is removed from the surface of one of the films and an insulated sheet inserted which has a length sufficient to encircle the capacitor section at least once. Winding is then completed to form the second capacitor. The ends of the section are metallized to provide electrical contacts. The circular extending sheets provide barriers preventing shorting of the plates of adjacent capacitors. The concept of that invention is sufficiently broad to include any number of capacitors in a single section. In actual industrial applications, as many as twenty capacitors have been so formed in a single capacitor section. The disclosure of U.S. Pat. No. 3,921,041 is incorporated herein by reference.

The present invention is an improvement to that disclosed and claimed in the referenced patent. It arises from the need for a service man to carry a large number of capacitors of different values when making service calls. As an example, an air conditioning service man may be called upon to service a number of different sized air conditioning units in a single workday. These units may require capacitors having different capacitance values. Accordingly, the serviceman must either carry a sufficient number of capacitors to meet any possible requirement, or he must make extra trips to obtain capacitors of the proper size. It is an object of the present invention to provide a single capacitor unit which may be carried by the serviceman and varied in the field to alter its capacitance. Other objects, features, and advantages will become apparent from the following description and appended claims.

DISCLOSURE OF INVENTION

In accordance with the present invention, a capacitor unit is provided which has multiple possible capacitance values selectable by the user. The unit includes a plurality of sub-capacitors, each having first and second plates separated by a dielectric. These sub-capacitors are wound concentrically and sequentially with the second and each succeeding sub-capacitor being wound upon the preceding sub-capacitor to form a single multi-capacitor section. The first plates of all the sub-capacitors extend to a first end of the section and the second plates of the sub-capacitors extend to a second end of the section. Barriers are provided for electrically separating the first plates of the sub-capacitors at the first end of the section and the second plates are electrically interconnected at the second end of the section.

The section is enclosed within a housing which carries a pair of electrical terminals. One of the terminals is fixed and connected to the electrically common second plates of the sub-capacitors. The other electrical terminal is connected by a first lead to a first plate of one of the sub-capacitors and by a second lead to the first plate of the other of the sub-capacitors. The second terminal is designed to be rotated prior to installation, thereby breaking the second lead and changing the overall capacitance.

BEST MODE FOR CARRYING OUT THE INVENTION

Figure 1:
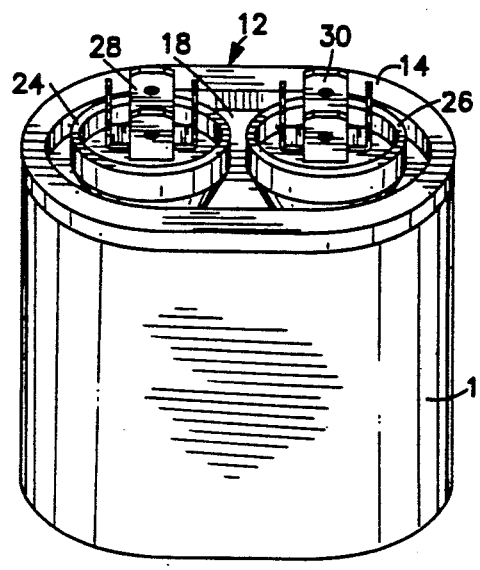
FIG. 1 is a perspective view of a capacitor unit in accordance with the invention.
Figure 2:
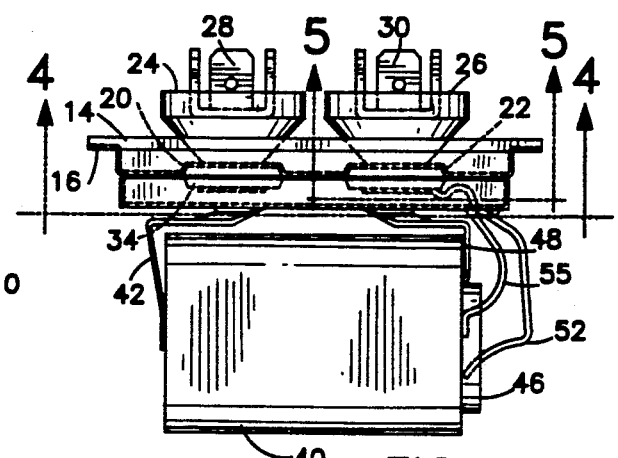
FIG. 2 is an elevational view of the top assembly of the unit of FIG. 1 with the housing removed.
Figure 3:
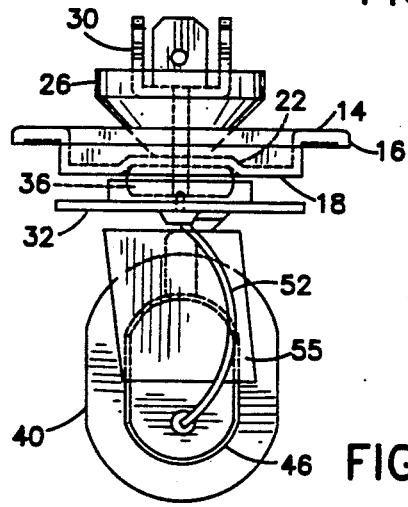
FIG. 3 is a right-end view of the assembly of FIG. 2.

FIG. 1 illustrates a capacitor unit constructed in accordance with this invention. It comprises a housing 10 in the form of a drawn sheet metal can which is fluid filled, closed and sealed by a top assembly 12. The top assembly 12 comprises a sheet metal cover 14 having a peripheral rim 16 which seals to the open end of housing 10. The cover 14 defines a central oval-shaped depressed region 18 including a pair of spaced circular bosses 20, 22. Mounted at the top of each of the bosses 20, 22 is a conventional electrical terminal assembly comprising a plastic insulator cup 24, 26 and a four-bladed terminal 28, 30.

Positioned just below and substantially aligned with the depressed area 18 of the cover 14 is a plastic interruptor plate 32. Sandwiched between the interruptor plate 32 and the cover 14, and positioned within the hollows formed by the bosses 20, 22, are a pair of thick circular silicone rubber bushings 34, 36. A metal washer 38 is positioned between each bushing and the interruptor plate 32.

Suspended below the top assembly 12 and within the liquid normally filling the housing 10 is a multiple capacitor section 40 of the type disclosed in the above-mentioned U.S. Pat. No. 3,921,041. One end of a first foil lead 42 is soldered to one end of the capacitor section to form a common lead. The other end of the first foil lead 42 is engaged by the head of a rivet 44 which completes the assembly of terminal 28 by tightly compressing the bushing 34.

The opposite end of the capacitor section 40 comprises the metal coated ends of separate first capacitor plates separated by a barrier 46. One end of a second foil lead 48 is soldered to the first capacitor plate which is external of the barrier 46. The other end of the lead 48 is captured by the head of a rivet 50 which completes the assembly of terminal 30 by tightly compressing the bushing 36.

Figure 4:
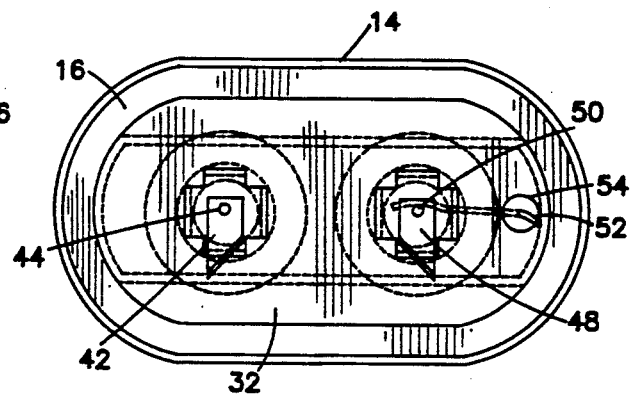
FIG. 4 is a cross-section taken substantially along the line 4—4 of FIG. 2.
Figure 5:
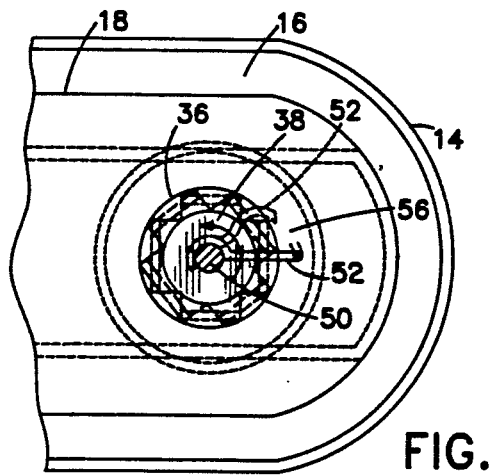
FIG. 5 is an enlarged cross-section taken substantially along the line 5—5 of FIG. 2.

The first capacitor plates which are inside the barrier 46 are electrically connected to the terminal 30 by means of a thin wire lead 52. The wire lead 52 passes through a hole in the interruptor plate 32 and is then wrapped around the rivet 50 between the washer 38 and the rubber bushing 36, as shown in FIG. 5. During assembly the portion of the wire 52 which extends between the rivet 50 and the hole in the interruptor plate 32 is pulled taut and a dab of epoxy 54 (FIG. 4) is applied to securely fasten it to the interruptor plate. A piece of insulating tape 55 is inserted between the wire 52 and the lead 48 to keep them electrically isolated. The entire top assembly 12 is then positioned on the liquid filled housing 10 and sealed thereto.

Figure 6:
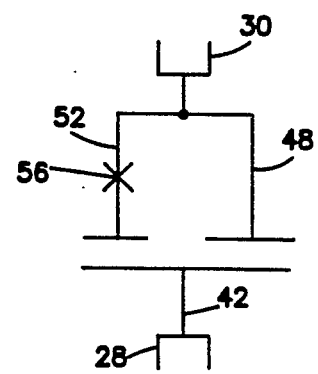
FIG. 6 is a schematic diagram illustrating the functioning of the invention.

FIG. 6 schematically illustrates a capacitor unit of this invention. One of the uses of this invention would be for an air-conditioning service technician. Air-conditioning units quite commonly require either a 5 microfarad capacitor or a 7.5 microfarad capacitor. Thus it might be assumed that the capacitor section between leads 42 and 48 has a capacitance of 5 microfarads. Similarly, the capacitor section between leads 42, 52 may have a capacitance of 2.5 microfarads. Thus the capacitor unit as presented to the technician in the first instance has a total capacitance of 7.5 microfarads. Assume, however, that the particular unit being serviced requires a 5 microfarad capacitor. Under these conditions the technician simply rotates the terminal 30 as shown by the arrow in FIG. 5 to thereby stretch and break wire lead 52 as at break location 56. This effectively removes the smaller capacitance from the circuit, leaving only a 5 microfarad capacitor remaining. As a result of this invention, the inventory of capacitors required to be stocked by a technician may be substantially reduced.

It will be apparent to those skilled in the art that a number of modifications and variations may be made in this invention without departing from its spirit and scope. For example, separate capacitors rather than a "multi-section", single winding could be used. Accordingly, the foregoing description is to be construed as illustrative only, rather than limiting. This invention is limited only by the scope of the following claims.

I claim:

1. An adjustable capacitor unit which comprises:
a housing;
first and second capacitors enclosed within said housing, each of said capacitors comprising a first capacitor plate and a second capacitor plate, the second plates of said capacitors being electrically common;
at least one selectively rotatable electrical terminal carried by a portion of said housing;
a first electrical lead connected between the first plate of said first capacitor and said electrical terminal; and
a second electrical lead connected between the first plate of said second capacitor and said electrical terminal whereby said first and second capacitors are in parallel electrical relationship, said second electrical lead having an end secured to said terminal whereby the lead is broken upon selective rotation of said terminal.

2. The capacitor unit of claim 1 wherein said housing portion comprises:
an interruptor plate adjacent thereto having a first major surface facing said housing portion and a second major surface;
a sealing bushing between said housing portion and the first major surface of said interruptor plate;
electrically conductive means extending between the second major surface of said interruptor plate and the terminal, and rotatable with said terminal, for compressing said sealing bushing against said housing portion;
means for connecting said first electrical lead to said electrically conductive means at said second major surface; and
said second electrical lead passing through, and secured to, said interruptor plate and having its end secured to said rotatable conductive means.

3. The capacitor unit of claim 2 wherein said housing portion comprises a top assembly closing the end of said housing.

4. The capacitor unit of claim 1 wherein said first and second capacitors are wound as a single section.

5. The capacitor unit of claim 4 wherein said housing portion comprises:
an interruptor plate adjacent thereto having a first major surface facing said housing portion and a second major surface;
a sealing bushing between said housing portion and the first major surface of said interruptor plate;
electrically conductive means extending between the second major surface of said interruptor plate and the terminal, and rotatable with said terminal, for compressing said sealing bushing against said housing portion;
means for connecting said first electrical lead to said electrically conductive means at said second major surface; and
said second electrical lead passing through, and secured to, said interruptor plate and having its end secured to said rotatable conductive means.

6. The capacitor unit of claim 5 wherein said housing portion comprises a cap assembly closing the end of said housing.

7. The capacitor unit of claim 4 wherein said single section comprises:
first and second lengths of metallized dielectric film wound to form respective first and second layers of metal separated by dielectric film, the metallized first layer extending to the first end of said section and the metallized second layer extending to the second end of said section, a portion of the metallized first layer being removed at a region intermediate the ends of said first length;
a non-conductive sheet inserted between said lengths and extending outwardly from the first end of said section adjacent said region to form a circular barrier separating the metallized portions of said first length;
means for making electrical contact between said first electrical lead and said first metallic layer on one side of said barrier;
means for making electrical contact between said second electrical lead and said first metallic layer on the other side of said barrier;
and means for making electrical contact with said second metallic layer.

8. The capacitor unit of claim 7 wherein said means for making contact with said first layer comprises a layer of metal deposited on the first end of said section.

9. The capacitor unit of claim 8 wherein said means for making contact with said second layer comprises a layer of metal deposited on the second end of said section.

* * * * *